(12) United States Patent
Yu et al.

(10) Patent No.: US 11,038,673 B2
(45) Date of Patent: Jun. 15, 2021

(54) DATA PROCESSING METHOD AND APPARATUS

(71) Applicant: Advanced New Technologies Co., Ltd., Grand Cayman (KY)

(72) Inventors: Chaofan Yu, Hangzhou (CN); Qunshan Huang, Hangzhou (CN); Lei Wang, Hangzhou (CN)

(73) Assignee: ADVANCED NEW TECHNOLOGIES CO., LTD., Grand Cayman (KY)

( * ) Notice: Subject to any disclaimer, the term of this patent is extended or adjusted under 35 U.S.C. 154(b) by 0 days.

(21) Appl. No.: 17/159,553

(22) Filed: Jan. 27, 2021

(65) Prior Publication Data

US 2021/0152343 A1    May 20, 2021

Related U.S. Application Data

(63) Continuation of application No. PCT/CN2019/112591, filed on Oct. 22, 2019.

(30) Foreign Application Priority Data

Dec. 12, 2018 (CN) .......................... 201811521025.0

(51) Int. Cl.
  *H04L 9/08* (2006.01)
  *H04L 9/14* (2006.01)
  *H04L 9/06* (2006.01)

(52) U.S. Cl.
  CPC .......... *H04L 9/0819* (2013.01); *H04L 9/0618* (2013.01); *H04L 9/0643* (2013.01); *H04L 9/0861* (2013.01); *H04L 9/14* (2013.01)

(58) Field of Classification Search
  CPC ....... H04L 9/0819; H04L 9/0643; H04L 9/14; H04L 9/0861; H04L 9/0618;
  (Continued)

(56) References Cited

U.S. PATENT DOCUMENTS 9,405,920 B1 * 8/2016 Roth .................... G06F 21/602
2006/0234772 A1   10/2006 Gill et al.
(Continued)

FOREIGN PATENT DOCUMENTS

CN    102413132 A    4/2012
CN    103179114 A    6/2013
(Continued)

OTHER PUBLICATIONS

International Search Report and Written Opinion, dated Jan. 23, 2020, for International Application No. PCT/CN2019/112591, 6 pages.

*Primary Examiner* — Abiy Getachew
(74) *Attorney, Agent, or Firm* — Seed IP Law Group LLP

(57) ABSTRACT

Implementations of the present specification provide a data processing method and apparatus. A method performed by a data provider includes: obtaining first encrypted data of first plaintext data, a first key used to decrypt the first encrypted data, and authorization information about the first plaintext data; sending a verification request to a data manager, the data manager including a first trusted execution environment; receiving authentication information from the data manager, and performing verification based on the authentication information; when the verification succeeds, securely transmitting the first key and the authorization information to the first trusted execution environment; and providing the first encrypted data to the data manager.

20 Claims, 10 Drawing Sheets

(58) Field of Classification Search
CPC ... H04L 63/062; H04L 9/0816; H04L 9/3236; G06F 21/602; G06F 21/76
See application file for complete search history.

(56) References Cited

U.S. PATENT DOCUMENTS

| | | | |
|---|---|---|---|
| 2007/0217603 A1* | 9/2007 | Quinard | H04N 21/63345 380/42 |
| 2014/0195804 A1* | 7/2014 | Hursti | H04L 9/14 713/168 |
| 2015/0089218 A1 | 3/2015 | Overby | |
| 2016/0065540 A1* | 3/2016 | Androulaki | G06F 3/0641 713/171 |
| 2016/0294551 A1* | 10/2016 | Ichikawa | H04L 9/0894 |
| 2017/0300713 A1* | 10/2017 | Fan | H04L 63/0435 |
| 2019/0294826 A1* | 9/2019 | Obara | H04L 9/0822 |

FOREIGN PATENT DOCUMENTS

| | | |
|---|---|---|
| CN | 104144048 A | 11/2014 |
| CN | 104581214 A | 4/2015 |
| CN | 104980477 A | 10/2015 |
| CN | 105592019 A | 5/2016 |
| CN | 105592071 A | 5/2016 |
| CN | 106453196 A | 2/2017 |
| CN | 106790304 A | 5/2017 |
| CN | 107924445 A | 4/2018 |
| CN | 108400989 A | 8/2018 |
| CN | 107959567 A | 4/2019 |
| CN | 110034924 A | 7/2019 |

* cited by examiner

DATA PROCESSING METHOD AND APPARATUS

BACKGROUND

Technical Field

Implementations of the present specification relate to the field of data processing technologies, and more specifically, to a method and an apparatus for data processing based on data use authorization.

Description of the Related Art

In the context of Internet big data, when providing a service to an object (an individual, an enterprise, or an organization), a service provider (such as a credit evaluation institution, a loan institution, or an insurance company) often evaluates the object (such as the credit and preferences of the object) by using historical data of the object. When conducting a business (such as business cooperation) with an object, an individual or an enterprise also often needs to evaluate the object (such as the credit and assets of the object). Evaluation requires trusted data of a user, but data of the user is distributed in various data sources (such as a bank, a tax bureau, and a real estate bureau). To protect privacy of an object and privacy of an evaluation method, in the existing technologies, a secure multi-party computing protocol is usually run between an evaluator (i.e., a data user) and one or more data sources (i.e., data providers), so that the evaluator obtains an evaluation result. Secure multi-party computing is mainly performed based on a cryptography technology, and real-time cooperation between multiple parties such as the data user and the data providers is required in a computing process.

Therefore, there is a need for a more effective data processing solution for protecting data security of each party.

BRIEF SUMMARY

Implementations of the present specification can provide a more effective data processing method and apparatus. For example, the presently disclosed technology can improve information privacy and data security, as well as provide configurative flexibility in multi-party sharing and computations.

An aspect of the present specification provides a data processing method. The method is performed by a data provider, the data provider having first plaintext data, and the method includes: obtaining first encrypted data of the first plaintext data, a first key used to decrypt the first encrypted data, and authorization information about the first plaintext data; sending a verification request to a data manager, the data manager including a first trusted execution environment; receiving authentication information from the data manager, and performing verification based on the authentication information, the authentication information being generated by the first trusted execution environment; when the verification succeeds, securely transmitting the first key and the authorization information to the first trusted execution environment; and providing the first encrypted data to the data manager.

Another aspect of the present specification provides a data processing method. The method is performed by a data provider, the data provider having first plaintext data, and the method includes: obtaining authorization information about the first plaintext data; sending a verification request to a data manager, the data manager including a first trusted execution environment; receiving authentication information from the data manager, and performing verification based on the authentication information, the authentication information being generated by the first trusted execution environment; and when the verification succeeds, securely transmitting the first plaintext data and the authorization information to the first trusted execution environment.

In an implementation, the authorization information includes at least one code hash value, the at least one code hash value is at least one code hash value of at least one program allowed to use the first plaintext data.

In an implementation, the authorization information includes at least one piece of access permission information corresponding to the at least one code hash value, and the access permission information is information about a calculation result of a corresponding program.

In an implementation, the access permission information is a second key, the second key being used to encrypt the corresponding calculation result and being provided by a calculation result user corresponding to the calculation result.

In an implementation, the access permission information is null information.

In an implementation, the performing verification based on the authentication information includes: verifying, based on the authentication information, whether a program for data use authorization is installed and is running in the first trusted execution environment.

In an implementation, the secure transmission is encrypted transmission.

Another aspect of the present specification provides a data processing method. The method is performed by a data manager, the data manager including a first trusted execution environment and storing at least one piece of encrypted data, at least one first key and at least one piece of authorization information corresponding to the at least one first key being stored in the first trusted execution environment, the at least one first key being used to decrypt the at least one piece of encrypted data to obtain at least one piece of plaintext data, the at least one piece of authorization information corresponding to the at least one piece of plaintext data, and the authorization information being information about at least one program allowed to use corresponding plaintext data, and the method includes: receiving a data request from a data user, the data request being used to request to use the at least one piece of plaintext data, and the data user including a second trusted execution environment; receiving authentication information from the data user, the authentication information being generated by the second trusted execution environment; performing verification for each piece of authorization information based on the authentication information and the authorization information in the first trusted execution environment; and for each piece of authorization information, when the verification succeeds, securely transmitting a first key corresponding to the authorization information to the second trusted execution environment by using the first trusted execution environment, and providing corresponding encrypted data to the data user.

Another aspect of the present specification provides a data processing method. The method is performed by a data manager, the data manager including a first trusted execution environment, at least one piece of plaintext data and at least one piece of authorization information respectively corresponding to the at least one piece of plaintext data being stored in the first trusted execution environment, and the authorization information being information about at least one program allowed to use corresponding plaintext data, and the method includes: receiving a data request from a data user, the data request being used to request to use the at least one piece of plaintext data, and the data user including a second trusted execution environment; receiving authentication information from the data user, the authentication information being generated by the second trusted execution environment; performing verification for each piece of authorization information based on the authentication information and the authorization information in the first trusted execution environment; and for each piece of authorization information, when the verification succeeds, securely transmitting plaintext data corresponding to the authorization information to the second trusted execution environment by using the first trusted execution environment.

In an implementation, the first trusted execution environment and the second trusted execution environment are located on one platform or different platforms.

In an implementation, the receiving the authentication information from the data user includes: receiving, by using the first trusted execution environment, the authentication information securely transmitted from the second trusted execution environment.

In an implementation, the authentication information includes a first code hash value of a first program that is installed and running in the second trusted execution environment, each piece of authorization information including at least one code hash value of at least one program; and the performing verification for each piece of authorization information based on the authentication information and the authorization information includes: verifying, for each piece of authorization information, whether the first code hash value is a code hash value included in the authorization information.

In an implementation, each piece of authorization information includes a first code hash value and a second key corresponding to the first code hash value, the second key being used to encrypt a calculation result of the first program and being provided by a calculation result user corresponding to the calculation result; and the method further includes: for each piece of authorization information, when the verification succeeds, further securely transmitting the second security key to the second trusted execution environment by using the first trusted execution environment.

In an implementation, the data manager further includes a data storage module, the at least one piece of encrypted data being stored in the data storage module.

Another aspect of the present specification provides a data processing method. The method is performed by a data user, the data user including a second trusted execution environment, and a first program running in the second trusted execution environment, and the method includes: sending a data request to a data manager to request to use at least one piece of plaintext data corresponding to at least one piece of encrypted data stored in the data manager, the data manager including a first trusted execution environment, at least one first key and at least one piece of authorization information corresponding to the at least one first key being stored in the first trusted execution environment, the at least one first key being used to decrypt the at least one piece of encrypted data to obtain the at least one piece of plaintext data, the at least one piece of authorization information corresponding to the at least one piece of plaintext data, and the authorization information being information about at least one program allowed to use corresponding plaintext data; sending authentication information to the data manager, so that the first trusted execution environment performs verification for each piece of authorization information based on the authentication information and the authorization information, the authentication information being generated by the second trusted execution environment; for each piece of authorization information, when the verification succeeds, receiving, by using the second trusted execution environment, a first key that corresponds to the authorization information and that is securely transmitted from the first trusted execution environment, obtaining encrypted data corresponding to the authorization information from the data manager, and decrypting the encrypted data by using the first key in the second trusted execution environment to obtain corresponding plaintext data; and performing calculation based on the at least one piece of plaintext data by using the first program in the second trusted execution environment to obtain a calculation result.

Another aspect of the present specification provides a data processing method. The method is performed by a data user, the data user including a second trusted execution environment, and a first program running in the second trusted execution environment, and the method includes: sending a data request to a data manager to request to use at least one piece of plaintext data stored in the data manager, the data manager including a first trusted execution environment, the at least one piece of plaintext data and at least one piece of authorization information respectively corresponding to the at least one piece of plaintext data being stored in the first trusted execution environment, and the authorization information being information about at least one program allowed to use corresponding plaintext data; sending authentication information to the data manager, so that the first trusted execution environment performs verification for each piece of authorization information based on the authentication information and the authorization information, the authentication information being generated by the second trusted execution environment; for each piece of authorization information, when the verification succeeds, receiving, by using the second trusted execution environment, plaintext data that corresponds to the authorization information and that is securely transmitted from the first trusted execution environment; and performing calculation based on the at least one piece of plaintext data by using the first program in the second trusted execution environment to obtain a calculation result.

In an implementation, the first program has a first code hash value, each piece of authorization information including a first code hash value and a second key corresponding to the first code hash value, and the second key being used to encrypt a calculation result of the first program and being provided by a calculation result user corresponding to the calculation result, and the method further includes: for each piece of authorization information, when the verification succeeds, receiving, by using the second trusted execution environment, the second key securely transmitted from the first trusted execution environment; after the calculation result is obtained, determining, in the second trusted execution environment, whether at least one second key respectively corresponding to the at least one piece of authorization information is consistent; and when the at least one second key is consistent, encrypting the calculation result by using the second key in the second trusted execution environment to obtain an encrypted calculation result.

In an implementation, the method further includes: sending the encrypted calculation result to the calculation result user after the encrypted calculation result is obtained.

In an implementation, the obtaining the encrypted data corresponding to the authorization information from the data manager includes: reading the encrypted data corresponding to the authorization information from the data manager.

Another aspect of the present specification provides a data processing apparatus. The apparatus is implemented by a data provider, the data provider having first plaintext data, and the apparatus includes: an acquisition unit, configured to obtain first encrypted data of the first plaintext data, a first key used to decrypt the first encrypted data, and authorization information about the first plaintext data; a sending unit, configured to send a verification request to a data manager, the data manager including a first trusted execution environment; a verification unit, configured to receive authentication information from the data manager, and perform verification based on the authentication information, the authentication information being generated by the first trusted execution environment; a secure transmission unit, configured to: when the verification succeeds, securely transmit the first key and the authorization information to the first trusted execution environment; and a providing unit, configured to provide the first encrypted data to the data manager.

Another aspect of the present specification provides a data processing apparatus. The apparatus is implemented by a data provider, the data provider having first plaintext data, and the apparatus includes: an acquisition unit, configured to obtain authorization information about the first plaintext data; a sending unit, configured to send a verification request to a data manager, the data manager including a first trusted execution environment; a verification unit, configured to receive authentication information from the data manager, and perform verification based on the authentication information, the authentication information being generated by the first trusted execution environment; and a secure transmission unit, configured to: when the verification succeeds, securely transmit the first plaintext data and the authorization information to the first trusted execution environment.

In an implementation, the verification unit is further configured to verify, based on the authentication information, whether a program for data use authorization is installed and is running in the first trusted execution environment.

Another aspect of the present specification provides a data processing apparatus. The apparatus is implemented by a data manager, the data manager including a first trusted execution environment and storing at least one piece of encrypted data, at least one first key and at least one piece of authorization information corresponding to the at least one first key being stored in the first trusted execution environment, the at least one first key being used to decrypt the at least one piece of encrypted data to obtain at least one piece of plaintext data, the at least one piece of authorization information corresponding to the at least one piece of plaintext data, and the authorization information being information about at least one program allowed to use corresponding plaintext data, and the apparatus includes: a first receiving unit, configured to receive a data request from a data user, the data request being used to request to use the at least one piece of plaintext data, and the data user including a second trusted execution environment; a second receiving unit, configured to receive authentication information from the data user, the authentication information being generated by the second trusted execution environment; a verification unit, configured to perform verification for each piece of authorization information based on the authentication information and the authorization information in the first trusted execution environment; and a first secure transmission unit for each piece of authorization information, configured to: when the verification succeeds, securely transmit a first key corresponding to the authorization information to the second trusted execution environment by using the first trusted execution environment, and a providing unit for each piece of authorization information, configured to provide corresponding encrypted data to the data user.

Another aspect of the present specification provides a data processing apparatus. The apparatus is implemented by a data manager, the data manager including a first trusted execution environment, at least one piece of plaintext data and at least one piece of authorization information corresponding to the at least one piece of plaintext data being stored in the first trusted execution environment, and the authorization information being information about at least one program allowed to use corresponding plaintext data, and the apparatus includes: a first receiving unit, configured to receive a data request from a data user, the data request being used to request to use the at least one piece of plaintext data, and the data user including a second trusted execution environment; a second receiving unit, configured to receive authentication information from the data user, the authentication information being generated by the second trusted execution environment; a verification unit, configured to perform verification for each piece of authorization information based on the authentication information and the authorization information in the first trusted execution environment; and a secure transmission unit for each piece of authorization information, configured to: when the verification succeeds, securely transmit plaintext data corresponding to the authorization information to the second trusted execution environment by using the first trusted execution environment.

In an implementation, the verification unit is further configured to receive, by using the first trusted execution environment, the authentication information securely transmitted from the second trusted execution environment.

In an implementation, the authentication information includes a first code hash value of a first program that is installed and running in the second trusted execution environment, each piece of authorization information including at least one code hash value of at least one program; and the verification unit is further configured to verify, for each piece of authorization information, whether the first code hash value is a code hash value included in the authorization information.

In an implementation, each piece of authorization information includes a first code hash value and a second key corresponding to the first code hash value, the second key being used to encrypt a calculation result of the first program and being provided by a calculation result user corresponding to the calculation result; and the apparatus further includes a second secure transmission unit, configured to: for each piece of authorization information, when the verification succeeds, further securely transmit the second security key to the second trusted execution environment by using the first trusted execution environment.

Another aspect of the present specification provides a data processing apparatus. The apparatus is implemented by a data user, the data user including a second trusted execution environment, and a first program running in the second trusted execution environment, and the apparatus includes: a first sending unit, configured to send a data request to a data manager to request to use at least one piece of plaintext data corresponding to at least one piece of encrypted data stored in the data manager, the data manager including a first trusted execution environment, at least one first key and at least one piece of authorization information corresponding to the at least one first key being stored in the first trusted execution environment, the at least one first key being used to decrypt the at least one piece of encrypted data to obtain the at least one piece of plaintext data, the at least one piece of authorization information corresponding to the at least one piece of plaintext data, and the authorization information being information about at least one program allowed to use corresponding plaintext data; a second sending unit, configured to send authentication information to the data manager, so that the first trusted execution environment performs verification for each piece of authorization information based on the authentication information and the authorization information, the authentication information being generated by the second trusted execution environment; a first receiving unit for each piece of authorization information, configured to: when the verification succeeds, receive, by using the second trusted execution environment, a first key that corresponds to the authorization information and that is securely transmitted from the first trusted execution environment, an acquisition unit for each piece of authorization information, configured to obtain encrypted data corresponding to the authorization information from the data manager, and a decryption unit for each piece of authorization information, configured to decrypt the encrypted data by using the first key in the second trusted execution environment to obtain corresponding plaintext data; and a calculation unit, configured to perform calculation based on the at least one piece of plaintext data by using the first program in the second trusted execution environment to obtain a calculation result.

Another aspect of the present specification provides a data processing apparatus. The apparatus is implemented by a data user, the data user including a second trusted execution environment, and a first program running in the second trusted execution environment, and the apparatus includes: a first sending unit, configured to send a data request to a data manager to request to use at least one piece of plaintext data stored in the data manager, the data manager including a first trusted execution environment, the at least one piece of plaintext data and at least one piece of authorization information respectively corresponding to the at least one piece of plaintext data being stored in the first trusted execution environment, and the authorization information being information about at least one program allowed to use corresponding plaintext data; a second sending unit, configured to send authentication information to the data manager, so that the first trusted execution environment performs verification for each piece of authorization information based on the authentication information and the authorization information, the authentication information being generated by the second trusted execution environment; a first receiving unit for each piece of authorization information, configured to: for each piece of authorization information, when the verification succeeds, receive, by using the second trusted execution environment, plaintext data that corresponds to the authorization information and that is securely transmitted from the first trusted execution environment; and a calculation unit, configured to perform calculation based on the at least one piece of plaintext data by using the first program in the second trusted execution environment to obtain a calculation result.

In an implementation, the first program has a first code hash value, each piece of authorization information including a first code hash value and a second key corresponding to the first code hash value, and the second key being used to encrypt a calculation result of the first program and being provided by a calculation result user corresponding to the calculation result, and the apparatus further includes: a second receiving unit for each piece of authorization information, configured to: when the verification succeeds, receive, by using the second trusted execution environment, the second key that corresponds to the authorization information and that is securely transmitted from the first trusted execution environment; a determining unit, configured to: after the calculation result is obtained, determine, in the second trusted execution environment, whether at least one second key respectively corresponding to the at least one piece of authorization information is consistent; and an encryption unit, configured to: when the at least one second key is consistent, encrypt the calculation result by using the second key in the second trusted execution environment to obtain an encrypted calculation result.

In an implementation, the apparatus further includes a third sending unit, configured to send the encrypted calculation result to the calculation result user after the encrypted calculation result is obtained.

In an implementation, the acquisition unit is further configured to read the encrypted data corresponding to the authorization information from the data manager.

Another aspect of the present specification provides a computing device, including a memory and a processor, the memory storing executable code, and the processor implementing any one of the above methods when executing the executable code.

As illustrated above and will be described in more detail below, in the data processing solutions according to the implementations of the present specification, a data authorization system that can be trusted by the data provider is established by using, e.g., trusted execution environment (TEE) and/or (remote attestation) RA technologies, so that privacy of data and compliant use of multi-party data can be ensured. Implementations of the presently disclosed technology can enable various improvements in multi-party computations. For example, data use behavior can be authorized and access control can be selectively performed on an output result of data convergence, to implement general entrance and exit permission control of actual multi-party data convergence. As an intermediate layer, the data authorization system decouples the data provider and the data user, so that the data provider does not need to deploy a data providing service to cooperate with a convergence service in real time to transmit data, thereby improving usability.

BRIEF DESCRIPTION OF THE SEVERAL VIEWS OF THE DRAWINGS

The implementations of the present specification can be made clearer by describing the implementations of the present specification with reference to the accompanying drawings.

DETAILED DESCRIPTION

The following describes the implementations of the present specification with reference to the accompanying drawings.

Figure 1:
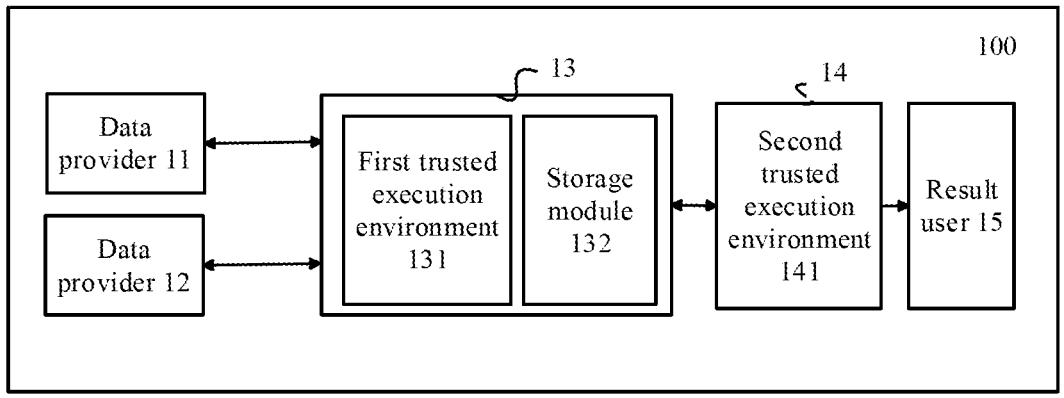
FIG. 1 is a schematic diagram illustrating a data processing system 100 according to an implementation of the present specification.

FIG. 1 is a schematic diagram illustrating a data processing system 100 according to an implementation of the present specification. As shown in FIG. 1, the system 100 includes a data provider 11, a data provider 12, a data manager 13, a data user 14, and a result user 15. The data providers 11, 12 are, for example, a party that has original data, such as a bank, a tax bureau, or a real estate bureau. The data manager 13 is equivalent to a data hosting platform, and includes a first trusted execution environment (TEE) 131 and a storage module 132. The data provider can upload data and authorization information of the data to the data manager in advance to authorize the use of the data, so that the data provider does not need to be online in real time when the data is used. The data user 14 is, for example, a service provider such as a credit evaluation institution, a loan institution, or an insurance company, and includes a second TEE 141. The result user 15 is, for example, a service object of the data user 14, such as an enterprise or an individual. After verifying the first TEE, the data provider 11 can upload encrypted data X of locally owned plaintext data X to the storage module 132 of the data manager 13, and securely transmit a corresponding first key for decryption and authorization information to the first TEE 131 of the data manager 13, so that the first TEE performs use authorization management on the plaintext data X. Similarly to the data provider 11, the data provider 12 can upload encrypted data Y of local plaintext data Y of the data provider 12 to the storage module 132, and securely transmit a corresponding first key and authorization information to the first TEE 131. For example, when the data user 14 sends a request for the use of the plaintext data X to the data manager 13, the first TEE can verify the second TEE 141 based on the authorization information corresponding to the plaintext data X, and after the verification succeeds, securely transmit the corresponding first key to the second TEE, and provide the encrypted data X to the data user, to authorize the data user 14 to use the plaintext data X, for example, perform model calculation based on the plaintext data X in the second TEE 141. The data user 14 can obtain the plaintext data Y from the data manager 13 by using a method similar to the above method. After obtaining a calculation result based on, for example, the plaintext data X and the plaintext data Y, the data user 14 can encrypt the calculation result based on a calculation result key securely transmitted by the first TEE to the second TEE, and send an encrypted calculation result to the result user 15 that provides the calculation result key.

FIG. 1 and the above description are merely brief summaries of the implementations of the present specification, and constitute no limitation to the scope of the implementations of the present specification. For example, the system 100 is not limited to including two data providers, but can include one or more data providers. The one or more data providers all host local data of the one or more data providers to the data manager 13 similarly to the above description.

Figure 2:
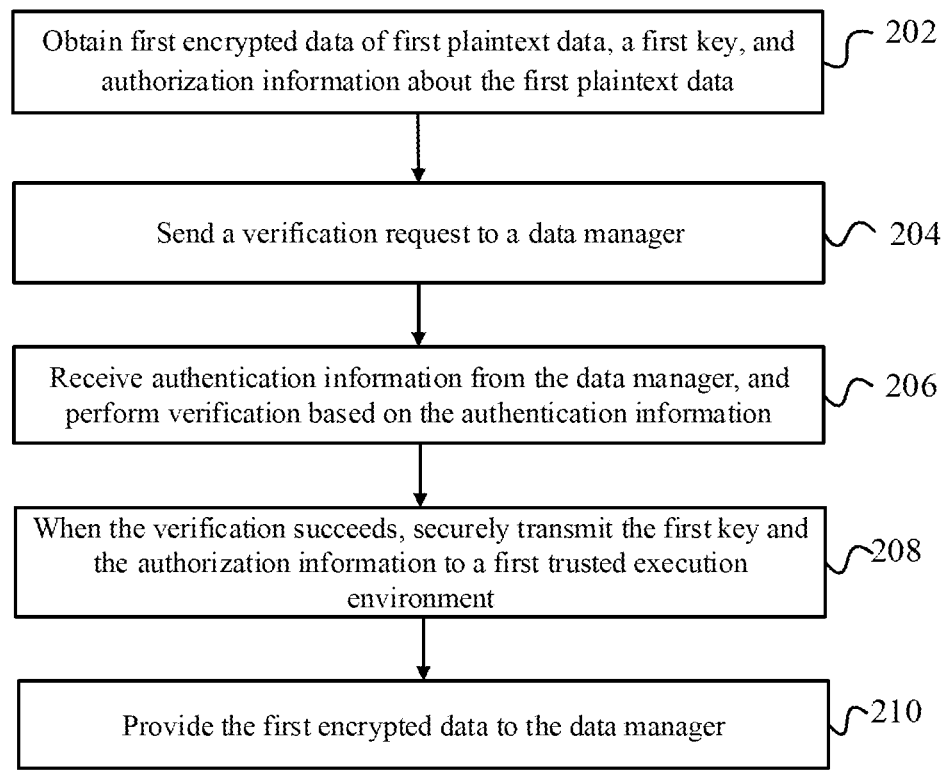
FIG. 2 is a flowchart illustrating a data processing method according to an implementation of the present specification.

FIG. 2 is a flowchart illustrating a data processing method according to an implementation of the present specification. The method is performed by a data provider, the data provider having first plaintext data, and the method includes the following steps:

Step S202: Obtain first encrypted data of the first plaintext data, a first key used to decrypt the first encrypted data, and authorization information about the first plaintext data.

Step S204: Send a verification request to a data manager, the data manager including a first trusted execution environment.

Step S206: Receive authentication information from the data manager, and perform verification based on the authentication information, the authentication information being generated by the first trusted execution environment.

Step S208: When the verification succeeds, securely transmit the first key and the authorization information to the first trusted execution environment.

Step S210: Provide the first encrypted data to the data manager.

First, in step S202, the first encrypted data of the first plaintext data, the first key used to decrypt the first encrypted data, and the authorization information about the first plaintext data are obtained.

The first encrypted data can be obtained by symmetrically or asymmetrically encrypting the first plaintext data. In the case of symmetric encryption, the first key is a key used to encrypt the first plaintext data. In the case of asymmetric encryption, the first key is a key different from a key used to encrypt the first plaintext data. It can be understood that descriptions such as "first" and "second" in the present specification are merely used for distinguishing between similar concepts for ease of description, and have no other limitation functions.

In an implementation, the authorization information about the first plaintext data includes at least one code hash value of at least one program that can use the first plaintext data. The code hash value can be a hash value of the entire code of a program, or can be a hash value occupied by a program in a memory at a known execution point. The at least one program is at least one program allowed by the data provider to use the first plaintext data. For example, when the authorization information includes multiple code hash values, it indicates that the first plaintext data can be used for calculation of multiple programs. For example, if the first plaintext data is transaction data of an individual within a predetermined time period, and the transaction data can be used for calculation of a first program for individual credit evaluation, calculation of a second program for individual consumption inclination, calculation of a third program for a specific population consumption level, etc., the data provider (such as a bank) can include code hash values of the first program, the second program, and the third program in authorization information corresponding to the transaction data, to respectively authorize the first program, the second program, and the third program.

In an implementation, the authorization information about the first plaintext data can further include calculation result access permission information corresponding to each code hash value. In an implementation, the access permission information is a second key, and the second key is provided by a calculation result user and is used to encrypt a calculation result obtained by using a program associated with a corresponding code hash value. Usually, the calculation result is asymmetrically encrypted, that is, the second key is a public key of the calculation result user, and a private key of the calculation result user needs to be used for decrypting an encrypted calculation result. It can be understood that the calculation result can alternatively be symmetrically encrypted. For example, the authorization information further includes a second key corresponding to a hash value of the first program, and the second key is, for example, a public key of a loan institution service object (such as an enterprise or an individual), and is transmitted by the enterprise or the individual to a bank (the data provider) in advance. After a corresponding calculation result is obtained based on the first plaintext data by using the first program, a data user (such as a loan institution) encrypts the calculation result by using the public key. After obtaining an encrypted calculation result, the enterprise or the individual decrypts the encrypted calculation result by using a private key of the enterprise or the individual, to obtain the plaintext calculation result. It can be understood that the authorization information does not include corresponding second keys for all code hash values. For example, in the case of the third program, a calculation result of the third program that is obtained based on the first plaintext data is a specific population consumption level, and the result does not involve individual privacy. Therefore, the calculation result does not need to be encrypted. Therefore, the authorization information can include no second key corresponding to a code hash value of the third program, that is, access permission information is null information.

It can be understood that the authorization information is not limited to including the code hash value and the second key. For example, the authorization information can include a code signature and encrypted data of the program that can use the first plaintext data, the encrypted data being obtained based on a predetermined encryption algorithm.

In step S204, the verification request is sent to the data manager, the data manager including the first trusted execution environment.

In an implementation, the data manager includes an authorization module, configured to authorize the data user to use data. The authorization module is the first trusted execution environment, and is, for example, a trusted execution environment (TEE) generated by using a technology such as SGX or Trust Zone. The verification request is used to request to verify, for example, whether the first TEE is a trusted execution environment, and whether a program for data use authorization is installed and is running in the first TEE. The data provider can directly send the verification request to the first TEE; or the data provider can send the verification request to a data manager platform, and the platform can forward the verification request to the first TEE.

In step S206, the authentication information is received from the data manager, and verification is performed based on the authentication information, the authentication information being generated by the first trusted execution environment.

After receiving the verification request, the first TEE generates the authentication information based on an internal mechanism of the first TEE, and sends the authentication information to the data provider, so that the data provider performs verification. The authentication information includes, for example, signature information, hardware information, and software information of the first TEE. The signature information is generated by using, for example, a hardware key of the first TEE. The hardware information includes, for example, various hardware indicators such as a CPU clock speed and a memory capacity. The software information includes a code hash value, a code name, a version, a running log, etc., of each program. As known by a person skilled in the art, the TEE can "measure" a program running in the TEE by using memory hardware, to obtain, for example, a code hash value of the program or a hash value occupied by the program in a memory at a specific execution point, and include "measurement" information of the program in the authentication information. The "measurement" is performed by using an integrated entity (the memory hardware) of the first TEE without involving any software or operating system, and therefore the "measurement" information is authentic. It can be understood that the authentication information is not limited to the above descriptions. For example, the authentication information does not need to include the signature information, the software information, etc., but can include only the software information, so that the data provider verifies the program running in the first TEE.

After receiving the authentication information from the first TEE, the data provider can verify whether the first TEE is a trusted execution environment based on the authentication information, for example, verify whether the signature information is signature information of the first TEE by using a pre-obtained hardware public key of the first TEE, and verify whether a hardware configuration of the first TEE matches a pre-obtained configuration. The first TEE can further perform verification by comparing the "measurement" information that is of the program running in the first TEE and that is included in the authentication information with a pre-obtained code hash value of the program for data use authorization, to determine whether the program for data use authorization is installed and is running in the first TEE. The code hash value is obtained from, for example, a code signature provided by a program publisher, or is obtained through calculation from the open-source program.

In this implementation of the present specification, a verification process performed based on the authentication information is not limited to the above descriptions. For example, the authentication information possibly does not include the hardware information, the signature information, etc., of the first TEE. Correspondingly, the data provider can verify the signature information, the hardware configuration, etc., of the first TEE by using a third-party server (such as an Intel server that provides a verification service to an enclave) that provides technical support to the first TEE.

It can be understood that, for TEEs obtained based on different technologies, specific content, forms, etc., of authentication information provided by the TEEs can be different. However, authentication information provided by any one of the TEEs can enable the data user to perform corresponding verification to determine whether the TEE is a secure execution environment, and/or determine whether a program running in the TEE is an expected program. In addition, the authentication information is not limited to being sent by the first TEE to the data provider, but can be obtained by another module of the data manager from the first TEE and sent by the module to the data provider.

In step S208, when the verification succeeds, the first key and the authorization information are securely transmitted to the first trusted execution environment.

After determining, through the verification, that the first TEE is a trusted execution environment and that the first TEE can provide a data use authorization service, the data provider can deliver the data owned by the first TEE to the data manager for hosting. Specifically, the data provider first securely transmits the first key and the corresponding authorization information to the first TEE. The secure transmission is, for example, encrypted transmission. Encrypted transmission means that data to be transmitted is encrypted before transmission and encrypted data is decrypted after being transmitted to a receiver, so that the receiver obtains the plaintext data, thereby ensuring that the plaintext data is not stolen by a malicious third party in a transmission process, and ensuring data transmission security. It can be understood that the secure transmission is not limited to the encrypted transmission, but can be performed by using any transmission method that can ensure data security and that can be obtained by a person skilled in the art, such as a secure transmission method of quantum communication.

Figure 3:
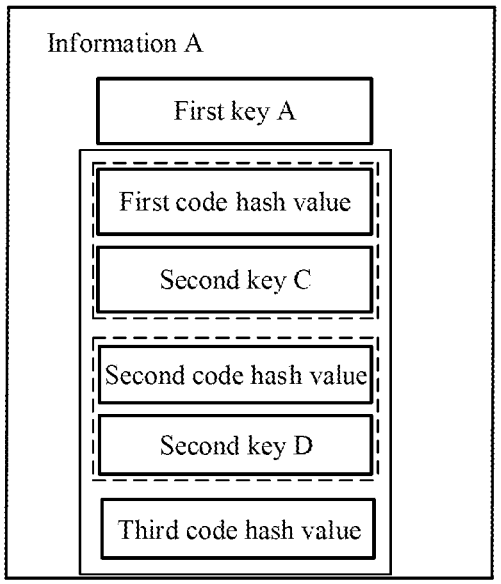
FIG. 3 schematically illustrates information securely transmitted by a data provider to a first TEE.

FIG. 3 is schematic diagram illustrating information A securely transmitted by the data provider to the first TEE. As shown in the figure, the information A securely transmitted by the data provider to the first TEE corresponds to the first plaintext data and includes the first key A and the authorization information A. As shown in a black box under "First key A" in the figure, the authorization information A includes a first code hash value and a second key C that correspond to each other, a second code hash value and a second key D that correspond to each other, and a third code hash value. The first key is used to decrypt the first encrypted data to obtain the first plaintext data. The first code hash value, the second code hash value, and the third code hash value are respectively, for example, the code hash values of the first program, the second program, and the third program that are described above. The second key C is, for example, a public key of a first result user C, that is, only the first result user C is authorized to use a calculation result of the first program that is obtained based on the first plaintext data. Similarly, the second key D is, for example, a public key of a second result user D, that is, only the second result user D is authorized to use a calculation result of the second program that is obtained based on the first plaintext data. However, the information A includes no public key corresponding to the third code hash value, that is, the calculation result of the third program that is obtained based on the first plaintext data does not involve private data, and does not need to be encrypted. It can be understood that the authorization information is not limited to including the code hash value of each program, but can include different information based on different authorization methods. For example, the authorization information can include a code signature, encrypted data, etc., of each program. In addition, the second key C/D is not limited to a public key of a corresponding result user. When a calculation result is symmetrically encrypted, the second key C/D can also be used to decrypt an encrypted calculation result. "Second" in the second key is used to distinguish the second key from the "first key" in the present specification.

In step S210, the first encrypted data is provided to the data manager.

In an implementation, the data provider sends the locally stored first encrypted data to the data manager. In an implementation, the data manager reads the first encrypted data from the data provider. For example, when the first plaintext data is, for example, transaction data of an individual that is provided by a bank, the data manager can read first encrypted data related to the individual based on, for example, an individual identity (such as an identity card number) and a data identity. In an implementation, the data provider sends a network disk address for storing the first encrypted data to the data manager, so that the data manager obtains the first encrypted data.

Figure 4:
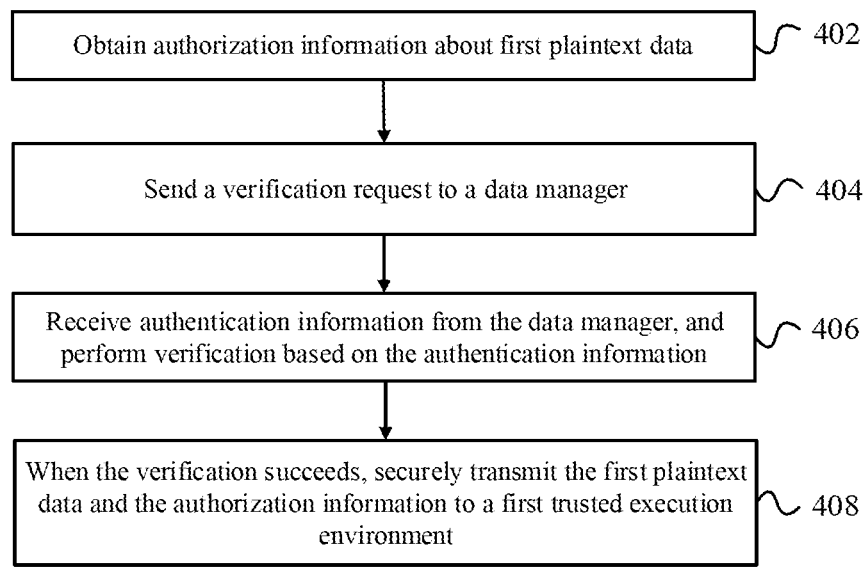
FIG. 4 is a flowchart illustrating a data processing method according to an implementation of the present specification.

FIG. 4 is a flowchart illustrating a data processing method according to an implementation of the present specification. The method is performed by a data provider, the data provider having first plaintext data, and the method includes the following steps:

Step S402: Obtain authorization information about the first plaintext data.

Step S404: Send a verification request to a data manager, the data manager including a first trusted execution environment.

Step S406: Receive authentication information from the data manager, and perform verification based on the authentication information, the authentication information being generated by the first trusted execution environment.

Step S408: When the verification succeeds, securely transmit the first plaintext data and the authorization information to the first trusted execution environment.

A difference between the method shown in FIG. 4 and the method shown in FIG. 2 lies in that the data provider does not encrypt the first plaintext data. Therefore, in step S402, only the authorization information about the first plaintext data is obtained without obtaining encrypted data and a first key of the first plaintext data. After the data provider verifies the first TEE as described above, in step S408, the data provider directly securely transmits the first plaintext data and the related authorization information to the first TEE together, that is, neither needs to encrypt the first plaintext data to obtain the encrypted data (and therefore a storage module of the data manager is not needed) nor needs to separately provide the encrypted data and securely transmit the decryption key of the encrypted data. Due to a security mechanism of the first TEE, the first plaintext data is secure when being stored in a form of plaintext data in the first TEE, and the first plaintext data is not disclosed in a process of securely transmitting the first plaintext data. Therefore, the first plaintext data can also be securely hosted in this method.

Figure 5:
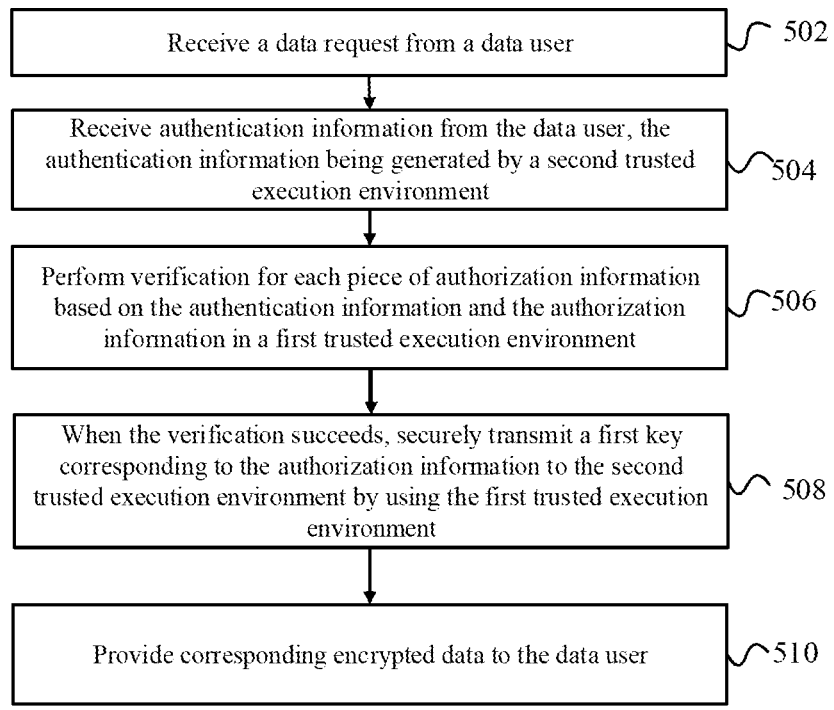
FIG. 5 is a flowchart illustrating a data processing method according to an implementation of the present specification.

FIG. 5 is a flowchart illustrating a data processing method according to an implementation of the present specification. The method is performed by a data manager, the data manager including a first trusted execution environment and storing at least one piece of encrypted data, at least one first key and at least one piece of authorization information respectively corresponding to the at least one first key being stored in the first trusted execution environment, the at least one first key being used to respectively decrypt the at least one piece of encrypted data to respectively obtain at least one piece of plaintext data, the at least one piece of authorization information respectively corresponding to the at least one piece of plaintext data, and the authorization information being information about at least one program allowed to use corresponding plaintext data, and the method includes the following steps:

Step S502: Receive a data request from a data user, the data request being used to request to use the at least one piece of plaintext data, and the data user including a second trusted execution environment.

Step S504: Receive authentication information from the data user, the authentication information being generated by the second trusted execution environment.

Step S506: Perform verification for each piece of authorization information based on the authentication information and the authorization information in the first trusted execution environment.

For each piece of the authorization information:

Step S508: When the verification succeeds, securely transmit a first key corresponding to the authorization information to the second trusted execution environment by using the first trusted execution environment; and Step S510: Provide corresponding encrypted data to the data user.

Figure 6:
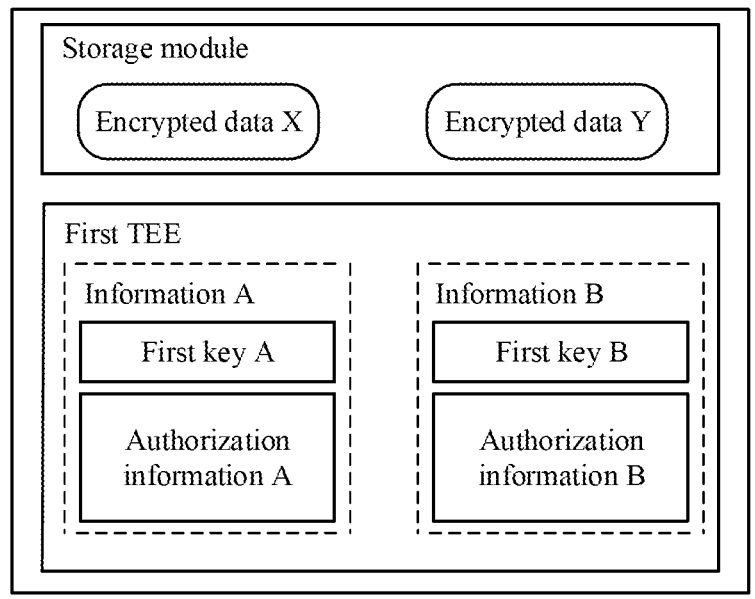
FIG. 6 schematically illustrates data stored in a data manager.

FIG. 6 is a schematic diagram illustrating data stored in a storage module and the first TEE of the data manager. As shown in FIG. 6, the storage module stores encrypted data X and encrypted data Y. The encrypted data X is uploaded by, for example, a data provider A to the data manager in advance, and corresponds to plaintext data X. The encrypted data Y is uploaded by, for example, a data provider B to the data manager in advance, and corresponds to plaintext data Y. It can be understood that the encrypted data X/Y is not limited to being stored in the storage module. For example, the encrypted data X/Y can be stored in the first TEE, or can be stored in a cloud disk.

The first TEE stores information A and information B. The information A is related to the encrypted data X, and includes a first key A and authorization information A. The information B is related to the encrypted data Y, and includes a first key B and authorization information B. The first key A is used to encrypt and decrypt the plaintext data X, and the authorization information A is authorization information about the plaintext data X. The second key B is used to encrypt and decrypt the plaintext data Y, and the authorization information B is authorization information about the plaintext data Y. For example content of the authorization information A, references can be made to FIG. 3. FIG. 6 shows only two pieces of encrypted data and two pieces of information respectively corresponding to the two pieces of encrypted data. However, the first TEE is not limited to storing only two pieces of information, but can store multiple pieces of information respectively corresponding to multiple pieces of encrypted data. In addition, the information A and the information B in FIG. 6 respectively correspond to different data providers. This implementation of the present specification is not limited thereto. The information A and the information B can correspond to one data provider, that is, the data provider A and the data provider B can be one data provider, that is, the plaintext data X and the plaintext data Y can be provided by one data provider. In the above description, the encrypted data X indicates that the encrypted data is data obtained by encrypting the plaintext data X. The encrypted data Y can be similarly explained. The information A, the first key A, and the authorization information A indicate that the information, the first key, and the authorization information are all related to the data provider A. The information B, the first key B, and the authorization information B can be similarly explained.

The following describes the steps in FIG. 5 in detail.

First, in step S502, the data request is received from the data user, the data request being used to request to use the at least one piece of plaintext data, and the data user including the second trusted execution environment.

The data user is, for example, a credit evaluation institution. When performing credit evaluation on a user, the data user can request, for example, two pieces of data related to the user from the data manager. The two pieces of data are respectively provided by, for example, a bank and a tax bureau to the data manager in advance. The data user can obtain the data related to the user based on, for example, a user identity (such as an identity card number), a data provider identity, and a data identity. Alternatively, the data user can be, for example, a cloud computing platform, which receives, for example, a commission from a credit evaluation institution to perform calculation for credit evaluation on the user by using a model.

The data user includes the second trusted execution environment (i.e., a second TEE). A predetermined program (for example, a first program) is running in the second TEE, to perform calculation such as F(X, Y) based on the plaintext data X and the plaintext data Y, so that the plaintext data X and the plaintext data Y are not disclosed in a calculation process due to a security mechanism of the second TEE. In an implementation, the second TEE and the first TEE are located on one platform. For example, both data hosting and user credit evaluation can be performed in an Alipay platform, that is, the Alipay platform is not only a data manager but also a data user. In this case, related data use authorization and data use are both performed in the first TEE and the second TEE, that is, data privacy is protected by using hardware. Therefore, data security is not affected even if the data manager and the data user are a same party. When the first TEE and the second TEE are on one platform, the second TEE can send a data use request to the first TEE. It can be understood that in this case, the second TEE can send the data use request to the data manager, or the data user can send the data use request to the data manager or the first TEE.

In an implementation, the first TEE and the second TEE are located on different platforms. For example, an Alipay platform is the data manager and the Alipay platform includes the first TEE, and a cloud computing platform is the data user and the cloud computing platform includes the second TEE. When the first TEE and the second TEE are on different platforms, a data user platform can send a data use request to a data manager platform. Similarly, the data user platform can send the data use request to the first TEE, or the second TEE can send the data use request to the data manager platform or the first TEE.

The data user sends the request to the data manager to request to obtain the at least one piece of plaintext data corresponding to the at least one piece of encrypted data in the data manager, that is, request to obtain the at least one piece of encrypted data and corresponding at least one decryption key (first key).

In step S504, the authentication information is received from the data user, the authentication information being generated by the second trusted execution environment.

The data user can send the authentication information generated by the second TEE to the data manager after sending the data request, or can send the authentication information generated by the second TEE to the data manager after the data manager sends a verification request to the data user.

The second TEE generates the authentication information based on an internal mechanism, so that the data manager performs verification. The authentication information includes, for example, signature information, hardware information, and software information of the second TEE. The signature information is generated by using, for example, a hardware key of the second TEE. The hardware information includes, for example, various hardware indicators such as a CPU clock speed and a memory capacity. The software information includes a code hash value, a code name, a version, a running log, etc., of each program. As can be known by a person skilled in the art, the TEE can "measure" a program running in the TEE by using memory hardware, to obtain, for example, a code hash value of the program or a hash value occupied by the program in a memory at a specific execution point, and include "measurement" information (such as the code hash value) of the program in the authentication information. The "measurement" is performed by using an own entity (the memory hardware) of the first TEE without involving any software or operating system, and therefore the "measurement" information is authentic. It can be understood that the authentication information is not limited to the above descriptions. For example, the authentication information does not need to include the signature information, the software information, etc., but can include only the software information, so that the first TEE verifies the program running in the second TEE.

In an implementation, the first TEE and the second TEE are located on one platform, and the authentication information is intra-platform (Intra-Platform) authentication information. For example, in an SGX technology, a file "REPORT" is generated as the intra-platform authentication information. In an implementation, the first TEE and the second TEE are located on different platforms, and the authentication information is inter-platform (Inter-Platform) authentication information. For example, in an SGX technology, the TEE generates a file "QUOTE" as the inter-platform authentication information for performing remote attestation (RA). The intra-platform authentication information and the inter-platform authentication information can have different file formats and encryption methods. For example, a symmetric encryption method can be used for the intra-platform authentication information (such as REPROT), and an asymmetric encryption method can be used for the inter-platform authentication information (such as QUOTE). In an implementation, the authentication information includes information related to the program (such as a first program) running in the second TEE. To not disclose model data (such as a parameter or an algorithm) in the running program, the second TEE securely transmits the authentication information to the first TEE. When a calculation model does not need to be protected, the second TEE or the data user can send the authentication information to the data manager, and the data manager sends the authentication information to the first TEE after receiving the authentication information.

In step S506, verification is performed for each piece of authorization information based on the authentication information and the authorization information in the first trusted execution environment.

After obtaining the authentication information, the first TEE performs, inside the first TEE, verification based on the authentication information and the authorization information respectively corresponding to the at least one piece of data requested by the data user. For example, referring to FIG. 6, the data user requests to use the plaintext data X and the plaintext data Y, and in the first TEE, the authorization information in the information A corresponding to the plaintext data X includes, for example, a code hash value of each program that can use the plaintext data X, and the authorization information in the information B corresponding to the plaintext data Y includes, for example, a code hash value of each program that can use the plaintext data Y. The first TEE needs to perform verification based on the authentication information, the information A, and the information B. The first TEE can verify whether the second TEE is a trusted execution environment based on the authentication information, for example, verify whether the signature information is signature information of the second TEE by using a pre-obtained hardware public key of the second TEE, and verify whether a hardware configuration of the second TEE matches a pre-obtained configuration. The first TEE can further verify, based on the "measured" hash value that is of the program running in the second TEE and that is included in the authentication information, whether the "measured" hash value matches one of multiple code hash values included in the information A, to determine whether the program running in the second TEE is a program that can be authorized to use the plaintext data X. Similarly, it is verified whether the "measured" hash value matches one of multiple code hash values included in the information B. Verification for the at least one piece of authorization information can be performed sequentially or in parallel. This is not limited in the present application.

As described above, the authorization information is not limited to including the code hash value of each program, but can include, for example, a code signature and code encrypted data of each program. For example, when the authorization information is the code signature, the first TEE can obtain a corresponding code hash value for the verification based on the code signature and a corresponding code public key obtained in advance from, for example, the data provider.

In this implementation of the present specification, a verification process performed based on the authentication information is not limited to the above descriptions. For example, the authentication information possibly does not include the hardware information, the signature information, etc., of the second TEE. Correspondingly, the data manager can verify the signature information, the hardware configuration, etc., of the second TEE by using a third-party server (such as an Intel server that provides a verification service to an enclave) that provides technical support to the second TEE.

It can be understood that, for TEEs obtained based on different technologies, specific content, forms, etc., of authentication information provided by the TEEs can be different. However, authentication information provided by any one of the TEEs can enable the data user to perform corresponding verification to determine whether the TEE is a secure execution environment, and/or determine whether a program running in the TEE is a program that can be authorized.

Steps S508 to S510 are steps performed for each piece of authorization information corresponding to the at least one piece of plaintext data requested by the data user. For each piece of authorization information, step S508 to step S510 can be performed sequentially or in parallel. In the following description, step S508 to step S510 performed for one piece of authorization information (such as the authorization information A shown in FIG. 6) are described as an example. A person skilled in the art can understand that step S508 to step S510 can be likewise performed for other authorization information in the at least one piece of authorization information.

Step S508: When verification succeeds, securely transmit a first key corresponding to the authorization information to the second trusted execution environment by using the first trusted execution environment.

For example, as shown in FIG. 6, the first TEE can securely transmit the first key A to the second TEE after verification based on the information A and the authentication information succeeds, that is, after verifying, in the first TEE, that the second TEE is a trusted execution environment and that the measured code hash value of the program running in the second TEE is an authorization code hash value corresponding to the plaintext data X.

Step S510: Provide corresponding encrypted data to the data user.

In an implementation, after securely transmitting the first key A to the data user as described above, the data manager sends the encrypted data X stored in the storage module of the data manager to the second TEE. In an implementation, the data user reads the encrypted data X from the storage module of the data manager. For example, when the plaintext data X is, for example, transaction data of an individual that is provided by a bank, the data user can read encrypted data X related to the individual based on, for example, an individual identity (such as an identity card number), a data provider identifier (such as a bank identifier), and a data identity.

In an implementation, when the encrypted data X is stored by the data manager in a cloud disk, the data manager can provide a download address of the encrypted data X to the data user, so that the data user downloads the encrypted data X.

In an implementation, as shown in FIG. 3, the authorization information A included in the information A can further include second keys of result users corresponding to some code hash values. For example, the authorization information A includes a second key C corresponding to a first code hash value. In this case, after verification based on the authorization information A succeeds, the first TEE further securely transmits the second key C to the second TEE, to encrypt a calculation result.

Figure 7:
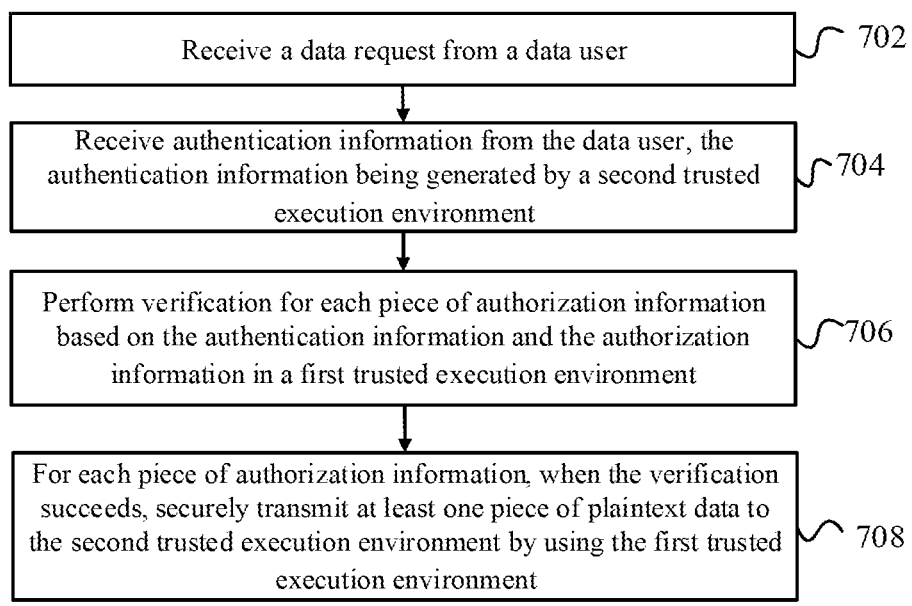
FIG. 7 is a flowchart illustrating a data processing method according to an implementation of the present specification.

FIG. 7 is a flowchart illustrating a data processing method according to an implementation of the present specification. The method is performed by a data manager, the data manager including a first trusted execution environment, at least one piece of plaintext data and at least one piece of authorization information corresponding to the at least one piece of plaintext data being stored in the first trusted execution environment, and the authorization information being information about at least one program allowed to use corresponding plaintext data, and the method includes the following steps:

Step S702: Receive a data request from a data user, the data request being used to request to use the at least one piece of plaintext data, and the data user including a second trusted execution environment.

Step S704: Receive authentication information from the data user, the authentication information being generated by the second trusted execution environment.

Step S706: Perform verification for each piece of authorization information based on the authentication information and the authorization information in the first trusted execution environment.

Step S708: For each piece of authorization information, when the verification succeeds, securely transmit the at least one piece of plaintext data to the second trusted execution environment by using the first trusted execution environment.

The method shown in FIG. 7 corresponds to the method shown in FIG. 4. According to the method shown in FIG. 4, the at least one piece of plaintext data and the at least one piece of authorization information respectively corresponding to the at least one piece of plaintext data are stored in the first trusted execution environment. A difference between the method shown in FIG. 7 and the method shown in FIG. 5 lies in that after the verification succeeds, the first TEE securely transmits the at least one piece of plaintext data to the second TEE without requiring the data manager to transmit at least one piece of encrypted data to the second TEE and requiring the first TEE to securely transmit at least one first key (decryption key) respectively corresponding to the at least one piece of encrypted data to the second TEE. The at least one piece of plaintext data can be well protected in the first TEE, in a secure transmission process, and in the second TEE. Therefore, security in the method can be ensured.

Figure 8:
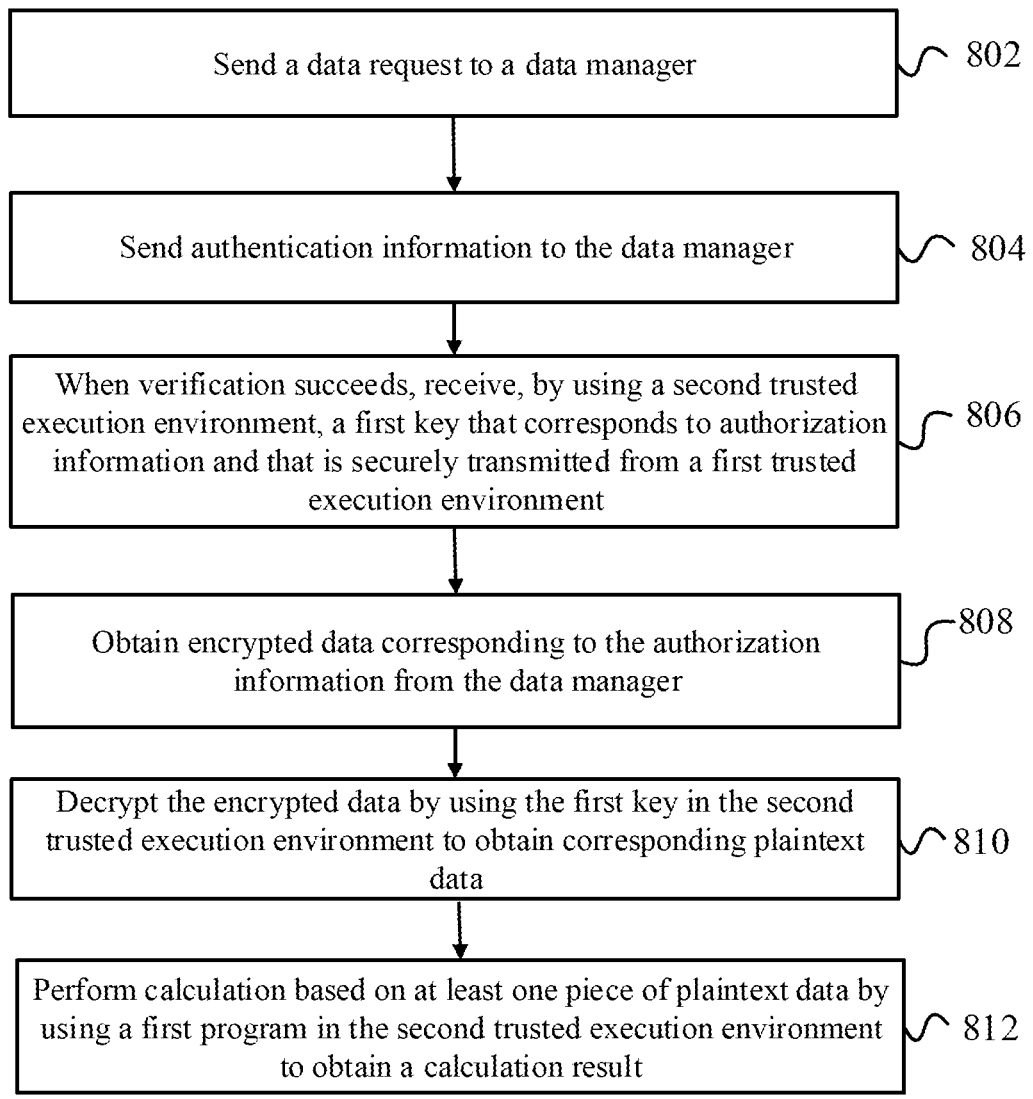
FIG. 8 is a flowchart illustrating a data processing method according to an implementation of the present specification.

FIG. 8 is a flowchart illustrating a data processing method according to an implementation of the present specification. The method is performed by a data user, the data user including a second trusted execution environment, and a first program running in the second trusted execution environment, and the method includes the following steps:

Step S802: Send a data request to a data manager to request to use at least one piece of plaintext data corresponding to at least one piece of encrypted data stored in the data manager, the data manager including a first trusted execution environment, at least one first key and at least one piece of authorization information respectively corresponding to the at least one first key being stored in the first trusted execution environment, the at least one first key being used to respectively decrypt the at least one piece of encrypted data to respectively obtain the at least one piece of plaintext data, the at least one piece of authorization information respectively corresponding to the at least one piece of plaintext data, and the authorization information being information about at least one program allowed to use corresponding plaintext data.

Step S804: Send authentication information to the data manager, so that the first trusted execution environment performs verification for each piece of authorization information based on the authentication information and the authorization information, the authentication information being generated by the second trusted execution environment.

For each piece of the authorization information:

Step S806: When the verification succeeds, receive, by using the second trusted execution environment, a first key that corresponds to the authorization information and that is securely transmitted from the first trusted execution environment;

Step S808: Obtain encrypted data corresponding to the authorization information from the data manager; and Step S810: Decrypt the encrypted data by using the first key in the second trusted execution environment to obtain corresponding plaintext data.

Step S812: Perform calculation based on the at least one piece of plaintext data by using the first program in the second trusted execution environment to obtain a calculation result.

The method shown in FIG. 8 is a method that is executed by the data user and that corresponds to the method shown in FIG. 5. The data user includes the second TEE. For example, the first program is running in the second TEE. Before performing calculation by using data, the first program first requests the corresponding data from the data manager, and then performs model calculation based on the corresponding data. Therefore, for detailed descriptions of step S802 to step S810, references can be made to the above corresponding descriptions of step S502 to step S508. Details are not described herein again.

In step S810, the encrypted data is decrypted by using the first key in the second trusted execution environment to obtain the corresponding plaintext data. For example, after obtaining the first key A shown in FIG. 6 and reading the encrypted data X from the storage module of the data manager as described above, the second TEE can decrypt the encrypted data X by using the first key A, to obtain the plaintext data X. Similarly, the plaintext data Y can be obtained by decrypting the second encrypted data Y by using the second key B obtained from the data manager.

In step S812, calculation is performed based on the at least one piece of plaintext data by using the first program in the second trusted execution environment to obtain the calculation result. The program performs, for example, F (X, Y) calculation based on data X and data Y, and F (X, Y) corresponds to a specific calculation model. The first program is run in the second TEE and performs calculation based on X and Y by using F (X, Y), to obtain the calculation result.

In an implementation, as described above, for each piece of authorization information, after the verification succeeds, the first TEE further securely transmits, to the second TEE, a key that is used to encrypt a calculation result and that corresponds to a code hash value, for example, the second key C shown in FIG. 3. The first program has, for example, a first code hash value. Each piece of authorization information corresponding to the at least one piece of plaintext data requested by the data user includes, for example, the first code hash value and a second key (for example, the second key C) corresponding to the first code hash value. The second key is used to encrypt a calculation result of the first program and is provided by a calculation result user corresponding to the calculation result. The method further includes: for each piece of authorization information, when the verification succeeds, receiving, by using the second trusted execution environment, the second key that corresponds to the authorization information and that is securely transmitted from the first trusted execution environment; after the calculation result is obtained, determining, in the second trusted execution environment, whether at least one second key respectively corresponding to the at least one piece of authorization information is consistent, for example, determining whether a second key that corresponds to the encrypted data X and that is received from the first TEE is consistent with a second key that corresponds to the encrypted data Y and that is received from the first TEE; and when the at least one second key is consistent, encrypting the calculation result by using the second key in the second trusted execution environment to obtain an encrypted calculation result, that is, when all the at least one second key is the second key C, the calculation result is encrypted by using the second key C. It can be understood that, in the above case, the second key can be an asymmetric encryption key, that is, a public key. After the encrypted calculation result is sent to the result user C, the result user C decrypts the encrypted calculation result by using a private key C of the result user C. However, this implementation is not limited thereto. For example, the second key can be a symmetric encryption key, that is, the result user C also uses the second key for decrypting.

After the encrypted calculation result is obtained, the second TEE or a data user platform can send the encrypted calculation result to a corresponding result user, or the corresponding result user can read the encrypted calculation result from the platform.

Figure 9:
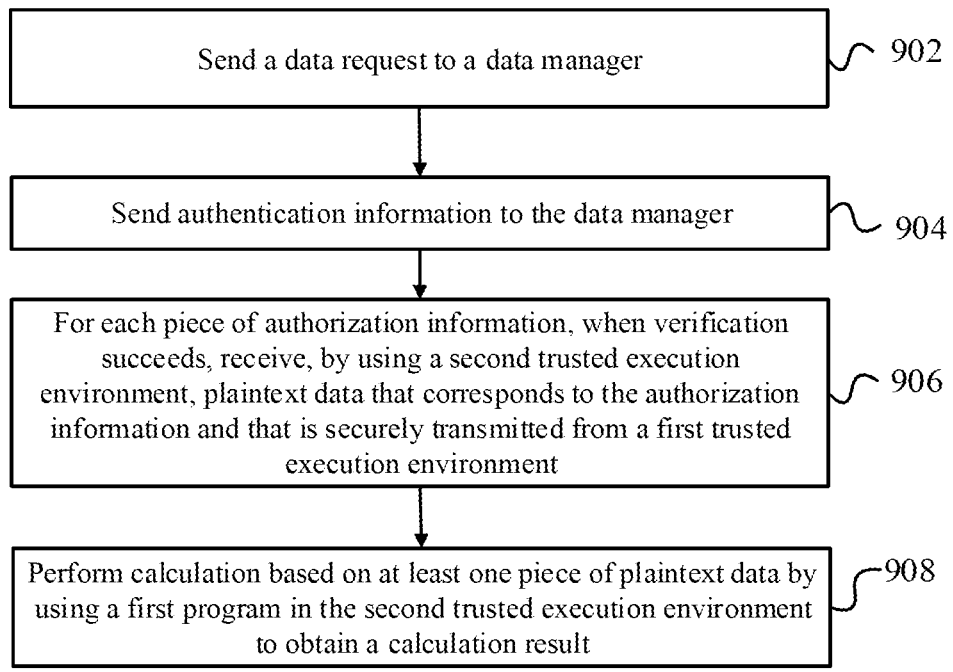
FIG. 9 is a flowchart illustrating a data processing method according to an implementation of the present specification.

FIG. 9 is a flowchart illustrating a data processing method according to an implementation of the present specification. The method is performed by a data user, the data user including a second trusted execution environment, and a first program running in the second trusted execution environment, and the method includes the following steps:

Step S902: Send a data request to a data manager to request to use at least one piece of plaintext data stored in the data manager, the data manager including a first trusted execution environment, the at least one piece of plaintext data and at least one piece of authorization information corresponding to the at least one piece of plaintext data being stored in the first trusted execution environment, and the authorization information being information about at least one program allowed to use corresponding plaintext data.

Step S904: Send authentication information to the data manager, so that the first trusted execution environment performs verification for each piece of authorization information based on the authentication information and the authorization information, the authentication information being generated by the second trusted execution environment.

Step S906: For each piece of authorization information, when the verification succeeds, receive, by using the second trusted execution environment, plaintext data that corresponds to the authorization information and that is securely transmitted from the first trusted execution environment.

Step S908: Perform calculation based on the at least one piece of plaintext data by using the first program in the second trusted execution environment to obtain a calculation result.

The method shown in FIG. 9 corresponds to the method shown in FIG. 7. A difference between the method shown in FIG. 9 and the method shown in FIG. 8 lies in that in step S906, when the verification succeeds, the at least one piece of plaintext data securely transmitted from the first trusted execution environment is received instead of separately obtaining encrypted data and a corresponding decryption key, so that no decryption step is required. Therefore, in step S908, calculation may be directly performed based on the at least one piece of plaintext data by using the first program, to obtain the calculation result.

Figure 10:
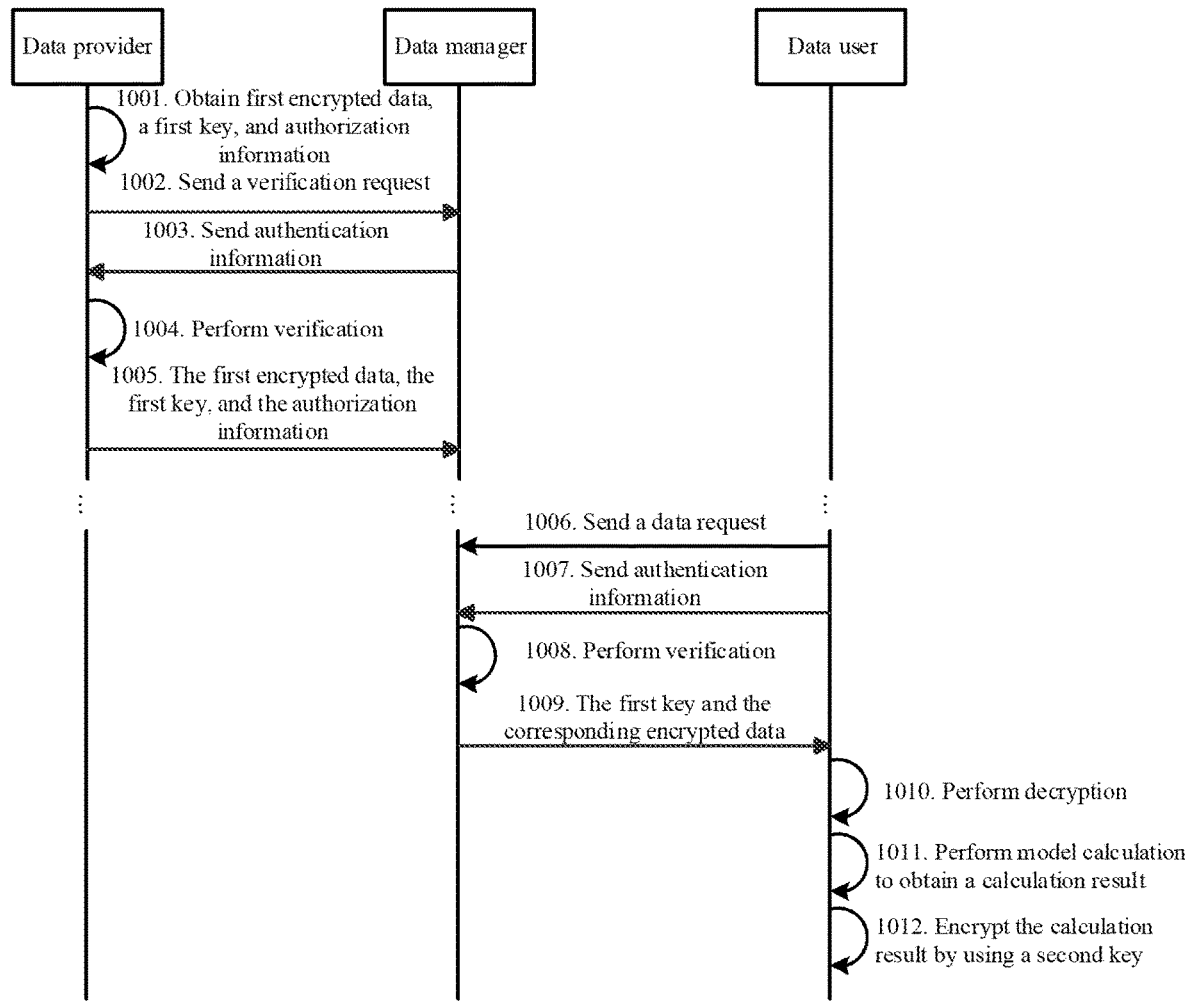
FIG. 10 is a diagram illustrating interaction between a data provider, a data manager, and a data user in a data processing method according to an implementation of the present specification.

FIG. 10 is a diagram illustrating interaction between a data provider, a data manager, and a data user in a data processing method according to an implementation of the present specification. The interaction between the three parties includes two phases. The first phase is interaction between the data provider and the data manager, and includes the followings steps: Step 1001: The data provider obtains first encrypted data of first plaintext data, a first key used to decrypt the first encrypted data, and authorization information about the first plaintext data. Step 1002: The data provider sends a verification request to the data manager. Step 1003: The data manager sends authentication information to the data provider after receiving the verification request, the authentication information being generated by a first trusted execution environment. Step 1004: The data provider performs verification based on the authentication information. Step 1005: After the verification succeeds, the data provider securely transmits the first key and the authorization information to the first TEE, and provides the first encrypted data to the data manager. According to the above steps, the data provider can host the data of the data provider to the data manager, to authorize, by using the data manager, a third party to use the first plaintext data, so that the data provider does not need to be online in real time in a data use process.

The second stage is interaction between the data manager and the data user, and includes the following steps: Step 1006: The data user sends a data request to the data manager, to request to use at least one piece of plaintext data in the data manager. Step 1007: The data user sends authentication information to the data manager, the authentication information being generated by a second TEE in the data user. Step 1008: Perform verification in the first TEE of the data manager based on the authentication information and related authorization information in the first TEE. Step 1009: For each piece of authorization information, after verification succeeds, the first trusted execution environment securely transmits a first key corresponding to the authorization information to the second trusted execution environment, and the data manager provides corresponding encrypted data to the data user. Step 1010: For each piece of authorization information, the data user decrypts the corresponding encrypted data by using a corresponding key in the second TEE, to obtain corresponding plaintext data. Step 1011: The data user performs model calculation based on the at least one piece of plaintext data in the second TEE, to obtain a calculation result. Step 1012: The data user encrypts the calculation result by using a second key included in the authorization information in the second TEE. After the encrypted calculation result is obtained, the data user can send the encrypted result to a result user, or the result user can actively read the encrypted result from the data user.

Figure 11:
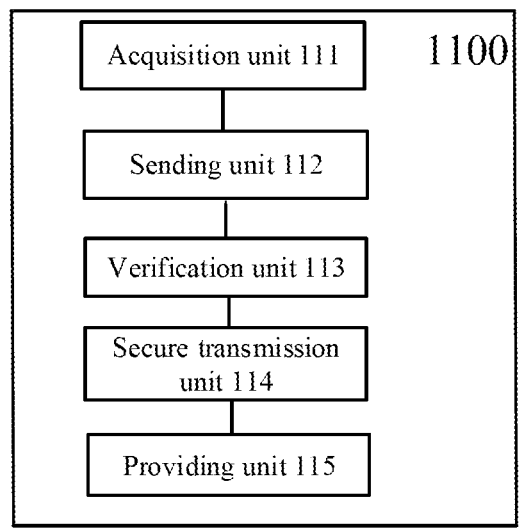
FIG. 11 illustrates a data processing apparatus 1100 according to an implementation of the present specification.

FIG. 11 illustrates a data processing apparatus 1100 according to an implementation of the present specification. The apparatus is implemented by a data provider, the data provider having first plaintext data, and the apparatus including: an acquisition unit 111, configured to obtain first encrypted data of the first plaintext data, a first key used to decrypt the first encrypted data, and authorization information about the first plaintext data; a sending unit 112, configured to send a verification request to a data manager, the data manager including a first trusted execution environment; a verification unit 113, configured to receive authentication information from the data manager, and perform verification based on the authentication information, the authentication information being generated by the first trusted execution environment; a secure transmission unit 114, configured to: when the verification succeeds, securely transmit the first key and the authorization information to the first trusted execution environment; and a providing unit 115, configured to provide the first encrypted data to the data manager.

In an implementation, the verification unit 113 is further configured to verify, based on the authentication information, whether a program for data use authorization is installed and is running in the first trusted execution environment.

Figure 12:
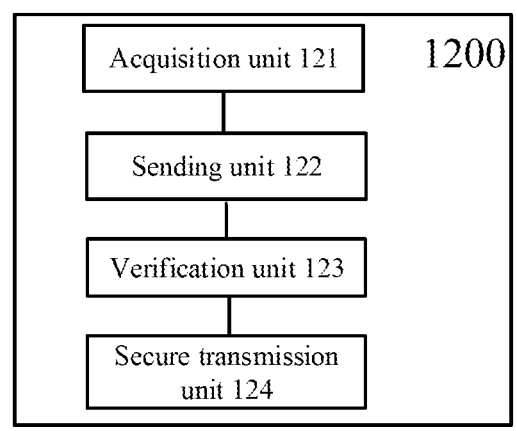
FIG. 12 illustrates a data processing apparatus 1200 according to an implementation of the present specification.

FIG. 12 illustrates a data processing apparatus 1200 according to an implementation of the present specification. The apparatus is implemented by a data provider, the data provider having first plaintext data, and the apparatus including: an acquisition unit 121, configured to obtain authorization information about the first plaintext data; a sending unit 122, configured to send a verification request to a data manager, the data manager including a first trusted execution environment; a verification unit 123, configured to receive authentication information from the data manager, and perform verification based on the authentication information, the authentication information being generated by the first trusted execution environment; and a secure transmission unit 124, configured to: when the verification succeeds, securely transmit the first plaintext data and the authorization information to the first trusted execution environment.

Figure 13:
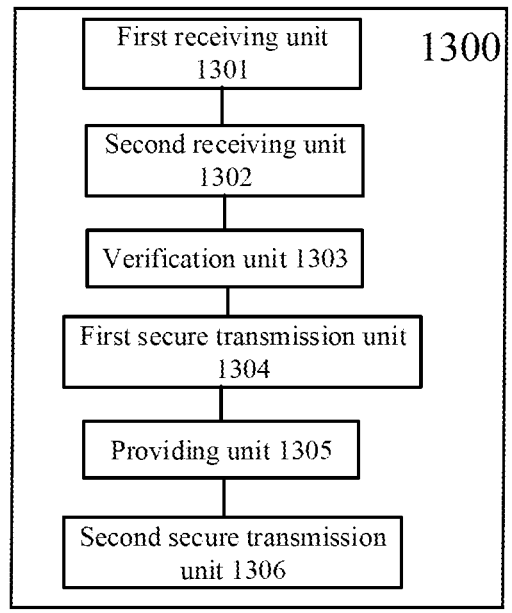
FIG. 13 illustrates a data processing apparatus 1300 according to an implementation of the present specification.

FIG. 13 illustrates a data processing apparatus 1300 according to an implementation of the present specification. The apparatus is implemented by a data manager, the data manager including a first trusted execution environment and storing at least one piece of encrypted data, at least one first key and at least one piece of authorization information corresponding to the at least one first key being stored in the first trusted execution environment, the at least one first key being used to decrypt the at least one piece of encrypted data to obtain at least one piece of plaintext data, the at least one piece of authorization information corresponding to the at least one piece of plaintext data, and the authorization information being information about at least one program allowed to use corresponding plaintext data, and the apparatus includes: a first receiving unit 1301, configured to receive a data request from a data user, the data request being used to request to use the at least one piece of plaintext data, and the data user including a second trusted execution environment; a second receiving unit 1302, configured to receive authentication information from the data user, the authentication information being generated by the second trusted execution environment; a verification unit 1303, configured to perform verification for each piece of authorization information based on the authentication information and the authorization information in the first trusted execution environment; and a first secure transmission unit 1304 for each piece of authorization information, configured to: when the verification succeeds, securely transmit a first key corresponding to the authorization information to the second trusted execution environment by using the first trusted execution environment, and a providing unit 1305 for each piece of authorization information, configured to provide corresponding encrypted data to the data user.

In an implementation, the verification unit 1303 is further configured to receive, by using the first trusted execution environment, the authentication information securely transmitted from the second trusted execution environment.

In an implementation, the authentication information includes a first code hash value of a first program that is installed and running in the second trusted execution environment, each piece of authorization information including at least one code hash value of at least one program; and the verification unit 1303 is further configured to verify, for each piece of authorization information, whether the first code hash value is a code hash value included in the authorization information.

In an implementation, each piece of authorization information includes a first code hash value and a second key corresponding to the first code hash value, the second key being used to encrypt a calculation result of the first program and being provided by a calculation result user corresponding to the calculation result; and the apparatus further includes a second secure transmission unit 1306, configured to: for each piece of authorization information, when the verification succeeds, further securely transmit the second security key to the second trusted execution environment by using the first trusted execution environment.

Figure 14:
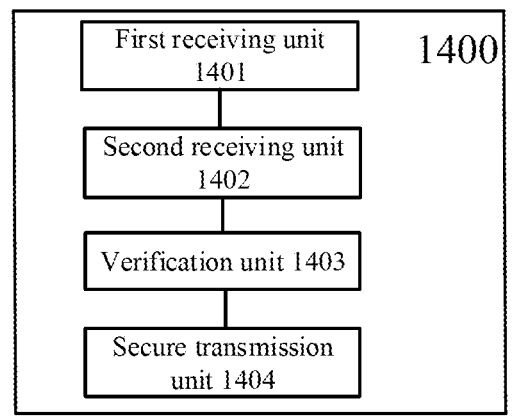
FIG. 14 illustrates a data processing apparatus 1400 according to an implementation of the present specification.

FIG. 14 illustrates a data processing apparatus 1400 according to an implementation of the present specification. The apparatus is implemented by a data manager, the data manager including a first trusted execution environment, at least one piece of plaintext data and at least one piece of authorization information respectively corresponding to the at least one piece of plaintext data being stored in the first trusted execution environment, and the authorization information being information about at least one program allowed to use corresponding plaintext data, and the apparatus includes: a first receiving unit 1401, configured to receive a data request from a data user, the data request being used to request to use the at least one piece of plaintext data, and the data user including a second trusted execution environment; a second receiving unit 1402, configured to receive authentication information from the data user, the authentication information being generated by the second trusted execution environment; a verification unit 1403, configured to perform verification for each piece of authorization information based on the authentication information and the authorization information in the first trusted execution environment; and a secure transmission unit 1404 for each piece of authorization information, configured to: when the verification succeeds, securely transmit plaintext data corresponding to the authorization information to the second trusted execution environment by using the first trusted execution environment.

Figure 15:
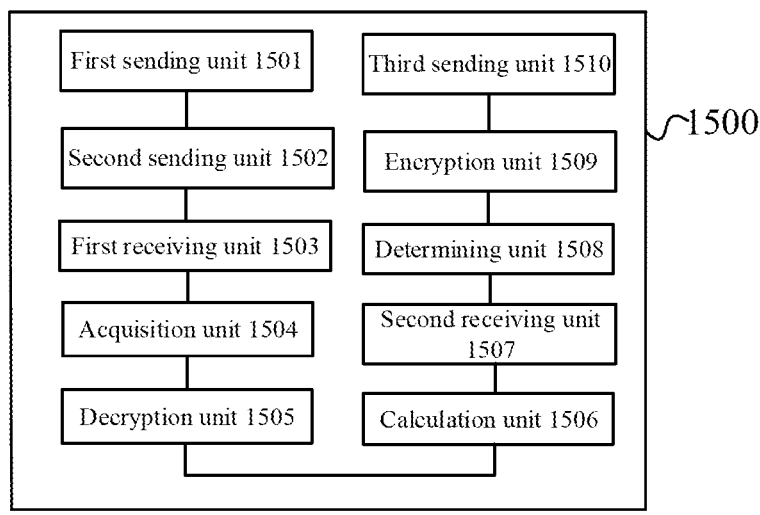
FIG. 15 illustrates a data processing apparatus 1500 according to an implementation of the present specification.

FIG. 15 illustrates a data processing apparatus 1500 according to an implementation of the present specification. The apparatus is implemented by a data user, the data user including a second trusted execution environment, and a first program running in the second trusted execution environment, and the apparatus includes: a first sending unit 1501, configured to send a data request to a data manager to request to use at least one piece of plaintext data corresponding to at least one piece of encrypted data stored in the data manager, the data manager including a first trusted execution environment, at least one first key and at least one piece of authorization information respectively corresponding to the at least one first key being stored in the first trusted execution environment, the at least one first key being used to respectively decrypt the at least one piece of encrypted data to respectively obtain the at least one piece of plaintext data, the at least one piece of authorization information respectively corresponding to the at least one piece of plaintext data, and the authorization information being information about at least one program allowed to use corresponding plaintext data; a second sending unit 1502, configured to send authentication information to the data manager, so that the first trusted execution environment performs verification for each piece of authorization information based on the authentication information and the authorization information, the authentication information being generated by the second trusted execution environment; a first receiving unit 1503 for each piece of authorization information, configured to: when the verification succeeds, receive, by using the second trusted execution environment, a first key that corresponds to the authorization information and that is securely transmitted from the first trusted execution environment, an acquisition unit 1504 for each piece of authorization information, configured to obtain encrypted data corresponding to the authorization information from the data manager, and a decryption unit 1505 for each piece of authorization information, configured to decrypt the encrypted data by using the first key in the second trusted execution environment to obtain corresponding plaintext data; and a calculation unit 1506, configured to perform calculation based on the at least one piece of plaintext data by using the first program in the second trusted execution environment to obtain a calculation result.

In an implementation, the first program has a first code hash value, each piece of authorization information including a first code hash value and a second key corresponding to the first code hash value, and the second key being used to encrypt a calculation result of the first program and being provided by a calculation result user corresponding to the calculation result, and the apparatus further includes: a second receiving unit 1507 for each piece of authorization information, configured to: when the verification succeeds, receive, by using the second trusted execution environment, the second key that corresponds to the authorization information and that is securely transmitted from the first trusted execution environment; a determining unit 1508, configured to: after the calculation result is obtained, determine, in the second trusted execution environment, whether at least one second key respectively corresponding to the at least one piece of authorization information is consistent; and an encryption unit 1509, configured to: when the at least one second key is consistent, encrypt the calculation result by using the second key in the second trusted execution environment to obtain an encrypted calculation result.

In an implementation, the apparatus further includes a third sending unit 1510, configured to send the encrypted calculation result to the calculation result user after the encrypted calculation result is obtained.

In an implementation, the acquisition unit 1504 is further configured to read the encrypted data corresponding to the authorization information from the data manager.

Figure 16:
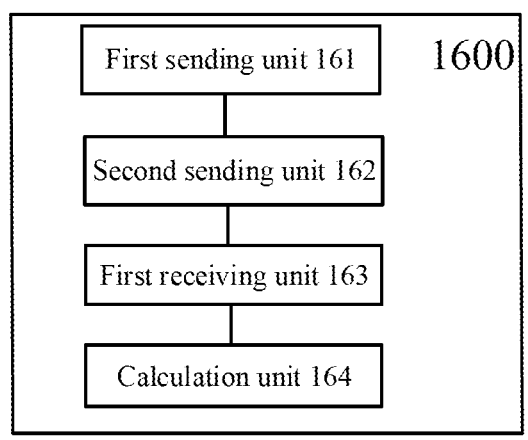
FIG. 16 illustrates a data processing apparatus 1600 according to an implementation of the present specification.

FIG. 16 illustrates a data processing apparatus 1600 according to an implementation of the present specification. The apparatus is implemented by a data user, the data user including a second trusted execution environment, and a first program running in the second trusted execution environment, and the apparatus includes: a first sending unit 161, configured to send a data request to a data manager to request to use at least one piece of plaintext data stored in the data manager, the data manager including a first trusted execution environment, the at least one piece of plaintext data and at least one piece of authorization information respectively corresponding to the at least one piece of plaintext data being stored in the first trusted execution environment, and the authorization information being information about at least one program allowed to use corresponding plaintext data; a second sending unit 162, configured to send authentication information to the data manager, so that the first trusted execution environment performs verification for each piece of authorization information based on the authentication information and the authorization information, the authentication information being generated by the second trusted execution environment; a first receiving unit 163 for each piece of authorization information, configured to: for each piece of authorization information, when the verification succeeds, receive, by using the second trusted execution environment, plaintext data that corresponds to the authorization information and that is securely transmitted from the first trusted execution environment; and a calculation unit 164, configured to perform calculation based on the at least one piece of plaintext data by using the first program in the second trusted execution environment to obtain a calculation result.

Another aspect of the present specification provides a computing device, including a memory and a processor, the memory storing executable code, and the processor implementing any one of the above methods when executing the executable code.

In the data processing solutions according to the implementations of the present specification, a data authorization system that can be trusted by the data provider is established by using a TEE and an RA technology, to ensure, through a technical aspect rather than third party trust, that an intermediate data authorization platform does not peep with and tamper with data of the data provider, runs at a fast speed, and supports convergence computing that can be represented by any code, and therefore is more efficient and more versatile. A whole set of protocol procedure is proposed for the data authorization system, the data provider, and the data user, and the procedure can ensure privacy of data and compliant use of multi-party data. In terms of design, the following two characteristics are achieved: Data use behavior can be authorized and access control can be selectively performed on an output result of data convergence, to meet general entrance and exit permission control of actual multi-party data convergence. As an intermediate layer, the data authorization system decouples the data provider and the data user, the data provider can upload the data at one time, and the data user uses the data for multiple times without requiring the data provider to repeatedly upload the data, so that data access efficiency can be effectively improved when the data is used repeatedly. In terms of design, the data authorization system allows the data provider to upload the data offline in advance, so that the data provider does not need to deploy a data providing service to cooperate with a convergence service in real time to transmit data, thereby improving usability.

The implementations in the present specification are all described in a progressive way, for same or similar parts in the implementations, references can be made to these implementations, and each implementation focuses on a difference from other implementations. Especially, the system implementations are basically similar to the method implementations, and therefore are described briefly. For related parts, references can be made to parts of the method implementation descriptions.

The above describes the specific implementations of the present specification. Other implementations fall within the scope of the appended claims. In some cases, the actions or steps described in the claims can be performed in an order different from the order in the implementations and can still achieve the desired results. In addition, the process depicted in the accompanying drawings does not necessarily require the shown particular order or sequence to achieve the desired results. In some implementations, multi-task processing and parallel processing can or may be advantageous.

A person of ordinary skill in the art can be further aware that, in combination with the examples described in the implementations disclosed in the present specification, units and algorithm steps can be implemented by using electronic hardware, computer software, or a combination thereof. To clearly describe interchangeability between the hardware and the software, compositions and steps of the examples have generally been described based on functions in the above descriptions. Whether the functions are performed by hardware or software depends on particular applications and design constraint conditions of the technical solutions. A person of ordinary skill in the art can use different methods to implement the described functions for each particular application, but it should not be considered that the implementation goes beyond the scope of the present application.

Steps of methods or algorithms described with reference to the implementations disclosed in the present specification can be implemented by using hardware, a software module executed by a processor, or a combination thereof. The software module can reside in a random access memory (RAM), a memory, a read-only memory (ROM), an electrically programmable ROM, an electrically erasable programmable ROM, a register, a hard disk, a removable disk, a CD-ROM, or any other form of storage medium known in the art.

In the above specific implementations, the objectives, technical solutions, and beneficial effects of the present application are further described in detail. It should be understood that the above descriptions are merely specific implementations of the present application, but are not intended to limit the protection scope of the present application. Any modification, equivalent replacement, improvement, made without departing from the spirit and principle of the present application should fall within the protection scope of the present application.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A data processing method, comprising:
obtaining, by a data provider, first encrypted data associated with first plaintext data, a first key used to decrypt the first encrypted data, and authorization information about the first plaintext data, wherein the authorization information includes at least one code hash value corresponding to at least one program allowed to use the first plaintext data and at least one piece of access permission information corresponding to the at least one code hash value, and wherein the access permission information is applicable to a calculation result of a corresponding program;
sending a verification request from the data provider to a data manager, the data manager including a first trusted execution environment;
receiving, by the data provider and from the data manager, authentication information generated by the first trusted execution environment;
performing, by the data provider, verification of the first trusted execution environment based on the authentication information;
responsive to a success of the verification, securely transmitting the first key and the authorization information from the data provider to the first trusted execution environment; and
causing the first encrypted data to be provided to the data manager.

2. The method according to claim 1, wherein the access permission information is a second key (a) used to encrypt the calculation result and (b) provided by a calculation result user corresponding to the calculation result.

3. The method according to claim 1, wherein the access permission information is null information.

4. The method according to claim 1, wherein the performing verification based on the authentication information includes: verifying, based on the authentication information, whether a program for data use authorization is installed and is running in the first trusted execution environment.

5. The method according to claim 1, wherein the secure transmission is encrypted transmission.

6. A data processing method, comprising:
- storing, by a data manager, at least one piece of encrypted data, at least one first key, and at least one piece of authorization information corresponding to the at least one first key in a first trusted execution environment, the at least one first key being used to decrypt the at least one piece of encrypted data to obtain at least one piece of plaintext data, the at least one piece of authorization information corresponding to the at least one piece of plaintext data, and the authorization information being information about at least one program allowed to use corresponding plaintext data;
- receiving, by the data manager and from a data user, a data request to use the at least one piece of plaintext data, the data user including a second trusted execution environment;
- receiving, by the data manager and from the data user, authentication information generated by the second trusted execution environment;
- for each piece of authorization information in the first trusted execution environment:
- performing, by the data manager, verification for the authorization information based, at least in part, on the authentication information; and
- responsive to a success of the verification, securely transmitting a first key corresponding to the authorization information to the second trusted execution environment by using the first trusted execution environment, and providing corresponding encrypted data to the data user.

7. The method according to claim 6, wherein the first trusted execution environment and the second trusted execution environment are located on one platform or different platforms.

8. The method according to claim 6, wherein the receiving the authentication information includes: receiving, by using the first trusted execution environment, the authentication information securely transmitted from the second trusted execution environment.

9. The method according to claim 6, wherein the authentication information includes a first code hash value corresponding to a first program that is installed and running in the second trusted execution environment, wherein each piece of authorization information includes at least one code hash value corresponding to at least one program; and wherein the performing verification for each piece of authorization information includes: verifying, for each piece of authorization information, whether the first code hash value is a code hash value included in the authorization information.

10. The method according to claim 9, wherein each piece of authorization information includes a first code hash value and a second key corresponding to the first code hash value, the second key being used to encrypt a calculation result of the first program and being provided by a calculation result user corresponding to the calculation result; and the method further comprises: for each piece of authorization information, responsive to the success of the verification, further securely transmitting the second security key to the second trusted execution environment by using the first trusted execution environment.

11. The method according to claim 6, wherein the data manager further includes a data storage module, the at least one piece of encrypted data being stored in the data storage module.

12. A data processing method, wherein the method is performed by a data user, the data user including a second trusted execution environment, a first program running in the second trusted execution environment, and the method comprising:
- sending, from a data user to a data manager, a data request to use at least one piece of plaintext data corresponding to at least one piece of encrypted data stored in the data manager, the data manager including a first trusted execution environment, at least one first key and at least one piece of authorization information corresponding to the at least one first key being stored in the first trusted execution environment, the at least one first key being used to decrypt the at least one piece of encrypted data to obtain the at least one piece of plaintext data, the at least one piece of authorization information corresponding to the at least one piece of plaintext data, and the authorization information being information about at least one program allowed to use corresponding plaintext data;
- sending, from the data user to the data manager, authentication information generated by the second trusted execution environment, so that the first trusted execution environment performs verification for each piece of authorization information based, at least in part, on the authentication information;
- for each piece of authorization information, responsive to a success of the verification, receiving, by the data user using the second trusted execution environment, a first key that corresponds to the authorization information and that is securely transmitted from the first trusted execution environment, obtaining encrypted data corresponding to the authorization information from the data manager, and decrypting the encrypted data by using the first key in the second trusted execution environment to obtain corresponding plaintext data; and
- performing calculation based on the at least one piece of plaintext data by using the first program in the second trusted execution environment to obtain a calculation result.

13. The method according to claim 12, wherein the first program has a first code hash value, each piece of authorization information including a first code hash value and a second key corresponding to the first code hash value, and the second key being used to encrypt a calculation result of the first program and being provided by a calculation result user corresponding to the calculation result, the method further comprising:
- for each piece of authorization information, responsive to the success of the verification, receiving, by using the second trusted execution environment, the second key that corresponds to the authorization information and that is securely transmitted from the first trusted execution environment;
- after the calculation result is obtained, determining, in the second trusted execution environment, whether at least one second key corresponding to the at least one piece of authorization information is consistent; and responsive to a determination that the at least one second key is consistent, encrypting the calculation result by using the second key in the second trusted execution environment to obtain an encrypted calculation result.

14. The method according to claim 13, further comprising: sending the encrypted calculation result to the calculation result user after the encrypted calculation result is obtained.

15. The method according to claim 12, wherein the obtaining the encrypted data corresponding to the authorization information from the data manager includes: reading the encrypted data corresponding to the authorization information from the data manager.

16. A non-transitory storage medium storing contents that, when executed by one or more processors, cause the one or more processors to perform actions comprising:

obtaining first encrypted data associated with first plaintext data, a first key used to decrypt the first encrypted data, and authorization information about the first plaintext data, wherein the authorization information includes at least one code hash value corresponding to at least one program allowed to use the first plaintext data and at least one piece of access permission information corresponding to the at least one code hash value, and wherein the access permission information is applicable to a calculation result of a corresponding program;

sending a verification request to a data manager, the data manager including a first trusted execution environment;

receiving, from the data manager, authentication information generated by the first trusted execution environment;

performing verification of the first trusted execution environment based on the authentication information;

responsive to a success of the verification, securely transmitting the first key and the authorization information to the first trusted execution environment; and causing the first encrypted data to be provided to the data manager.

17. The storage medium according to claim 16, wherein the access permission information is a second key (a) used to encrypt the calculation result and (b) provided by a calculation result user corresponding to the calculation result.

18. The storage medium according to claim 16, wherein the access permission information is null information.

19. The storage medium according to claim 16, wherein the performing verification based on the authentication information includes: verifying, based on the authentication information, whether a program for data use authorization is installed and is running in the first trusted execution environment.

20. The storage medium according to claim 16, wherein the secure transmission is encrypted transmission.

* * * * *